Figure 2:
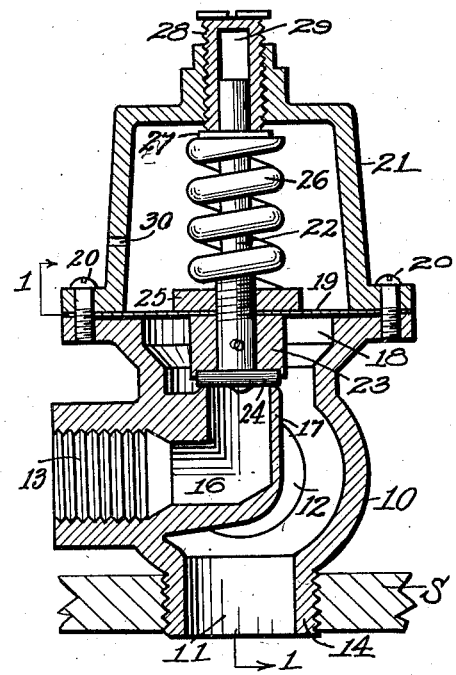

Oct. 16, 1928.

C. SMITH 1,688,093

DIAPHRAGM TYPE RELIEF VALVE

Filed July 25, 1923

Inventor
Chetwood Smith
By Attorneys
Southgate & Southgate

Patented Oct. 16, 1928.

1,688,093

UNITED STATES PATENT OFFICE.

CHETWOOD SMITH, OF WORCESTER, MASSACHUSETTS.

DIAPHRAGM-TYPE RELIEF VALVE.

Application filed July 25, 1923. Serial No. 653,675.

This invention relates to a relief valve of the diaphragm type, used particularly with hot water storage systems and for other similar purposes. Such valves as heretofore known have been designed for use at the end of branch or "dead end" pipes, through which pipes there is little or no normal circulation of water. Valves thus located quickly become clogged with dirt or sediment and not infrequently fail to operate when needed.

Accordingly it is one important object of my invention to provide a construction of relief valve adapted to be attached directly to a boiler or other water container and having its parts so disposed and connected that the normal flow of water is through the relief valve casing.

Another object of my invention is to provide a relief valve of the diaphragm type in which the pressure-regulating and valve guiding parts are disposed beyond the diaphragm and out of contact with the water passing through the valve.

An important feature of my invention relates to the provision of a relief valve in which the inlet and outlet openings of the casing are at an angle of substantially 90 degrees to each other, so that a very active circulation of water is set up in all parts of the valve casing as the normal flow of water enters and leaves the casing.

My invention further relates to arrangements and combinations of parts which will be hereinafter described and more particularly pointed out in the appended claim.

A preferred form of the invention is shown in the drawings in which

Figure 1:
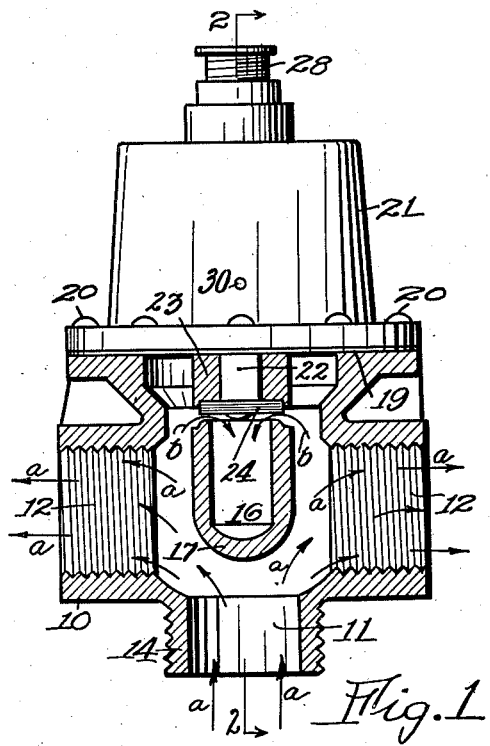

Fig. 1 is a front elevation of my improved valve, the view being taken partly in section along the line 1—1 of Fig. 2; and Fig. 2 is a sectional side elevation taken along the line 2—2 in Fig. 1.

Referring to the drawings, my improved relief valve comprises a casing 10 having an inlet opening 11, one or more outlet openings 12 and a relief or waste opening 13. The inlet opening 11 is formed in a projection 14 of the casing 10, said projection being externally threaded and being adapted for attachment directly to a storage tank S or to a boiler or other container.

The waste outlet 13 communicates directly with an angular passage 16 formed in a portion 17 integral with the casing 10 and projecting into the inner chamber or water space of the valve. The casing 10 is also provided with an upper opening 18 which is closed by a thin flexible diaphragm 19, clamped by screws 20 between the upper flange of the casing 10 and the lower end of a valve head or cap 21.

A threaded stud 22 extends through a central opening in the diaphragm 19 and is provided at its lower end with a collar or head 23 recessed to receive a fiber washer 24 which is adapted to engage a suitable valve seat at the upper end of the angular passage 16 and to normally close said passage. The stud 22 is clamped in position on the diaphragm 19 by a binding nut 25 and is pressed yieldingly downward to seat the valve by a heavy coil spring 26 surrounding the stud 22.

The spring 26 at its lower end engages the nut 25 and at its upper end is engaged by a washer 27 pressed downward by an adjustable bushing or sleeve 28 threaded into the upper end of the valve cap 21. The bushing 28 is provided with an axial opening 29 which serves as a guide for the upper end of the valve stem or rod 22. By adjustment of the bushing 28 in the cap 21 the pressure at which the relief valve will open may be increased or reduced as desired.

The normal circulation of water through the casing 10 is indicated by the arrows $a$ in Fig. 1 and the flow of water when the relief valve is open is indicated by the arrows $b$.

An air vent 30 is provided in the cap 21 so that it will be impossible to build up an abnormal pressure above the diaphragm in the event of possible leakage through the central opening of the diaphragm.

Having thus described my construction, it will be seen that my improved relief valve is exceedingly simple in construction, that it provides for active circulation of water through all parts of the casing, even when the relief valve is closed and that any dirt or sediment collecting in the casing 10 will naturally drop out of the casing through the inlet opening 11 into the storage tank S where it can do no harm. Furthermore, the spring 26 and guide bushing 28 are above the diaphragm 19 and are out of contact with the water circulating through the valve casing.

Having thus described my invention and the advantages thereof I do not wish to be limited to the details herein disclosed otherwise than as set forth in the claim, but what I claim is:—

A diaphragm relief valve comprising a casing having a water space and having inlet, outlet and waste openings, said casing having a portion projecting inwardly into the water space thereof and having an angular passage therein connected with said waste opening, a relief valve normally closing said angular waste passage, a diaphragm on which said relief valve is mounted, and spring means to seat said valve yieldingly on said projection to normally close said angular passage, said inlet opening being positioned to direct the inflow of fluid directly against said projection and alongside said projection at the end and both sides thereof, and said outlet opening being positioned perpendicular to said inlet opening, whereby active circulation of fluid within said water space and about said projection is effected.

In testimony whereof I have hereunto affixed my signature.

CHETWOOD SMITH.